US010733298B2

(12) United States Patent
Khatri et al.

(10) Patent No.: US 10,733,298 B2
(45) Date of Patent: Aug. 4, 2020

(54) SYSTEM MANAGEMENT AUDIT LOG SNAPSHOT

(71) Applicant: DELL PRODUCTS, L.P., Round Rock, TX (US)

(72) Inventors: Mukund P. Khatri, Austin, TX (US); Alaric J. N. Silveira, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 200 days.

(21) Appl. No.: 15/664,009

(22) Filed: Jul. 31, 2017

(65) Prior Publication Data
US 2019/0034635 A1 Jan. 31, 2019

(51) Int. Cl.
*H04L 29/06* (2006.01)
*G06F 21/57* (2013.01)
*G06F 21/55* (2013.01)

(52) U.S. Cl.
CPC ............ *G06F 21/57* (2013.01); *G06F 21/552* (2013.01); *G06F 21/575* (2013.01); *G06F 2221/034* (2013.01); *G06F 2221/2151* (2013.01)

(58) Field of Classification Search
CPC ................................. G06F 21/57; G06F 22/03
See application file for complete search history.

(56) References Cited

U.S. PATENT DOCUMENTS

| 6,725,240 | B1* | 4/2004 | Asad | G06F 21/6227 |
| 7,877,607 | B2* | 1/2011 | Circenis | G06F 21/10 380/229 |
| 8,006,094 | B2 | 8/2011 | Savitzky et al. | |
| 8,412,946 | B2 | 4/2013 | Savitzky et al. | |
| 8,560,839 | B2* | 10/2013 | Barham | G06F 21/6218 713/156 |
| 9,071,587 | B2 | 6/2015 | Heninger et al. | |
| 9,111,098 | B2 | 8/2015 | Smith et al. | |
| 9,659,171 | B2 | 5/2017 | Treweek et al. | |
| 2006/0074600 | A1* | 4/2006 | Sastry | G06F 21/57 702/187 |
| 2011/0041178 | A1* | 2/2011 | Jakobsson | G06F 21/566 726/22 |
| 2013/0191879 | A1 | 7/2013 | Jaber et al. | |
| 2014/0201094 | A1 | 7/2014 | Herrington et al. | |
| 2016/0292205 | A1 | 10/2016 | Massey et al. | |
| 2017/0063884 | A1 | 3/2017 | Seigel | |
| 2019/0327250 | A1* | 10/2019 | David | H04L 63/20 |

* cited by examiner

Primary Examiner — Wasika Nipa
(74) Attorney, Agent, or Firm — Isidore PLLC

(57) ABSTRACT

A controller of an information handling system (IHS) performs a method to detect tampering with functional components of IHS. Following a last authorized configuration change of locally-available information handling resources, a unique code is generated and stored with a time-stamped system log entry in a system memory. Prior to transit, a system management audit (SMA) log snapshot is generated and provided to an audit device for separately conveying to a recipient of the IHS. In response to powering up at least the controller of the IHS after transit, a current SMA log snapshot is obtained that includes a current SMA log entry and a current unique code. Access by an audit device is provided to the current SMA log snapshot to enable comparison to the SMA log snapshot created prior to transit for identifying whether there has been tampering with the IHS.

20 Claims, 5 Drawing Sheets

SYSTEM MANAGEMENT AUDIT LOG SNAPSHOT

BACKGROUND

1. Technical Field

The present disclosure relates in general to an information handling system (IHS), and more particularly to detecting tampering with the IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many consumers of information handling resources are increasing demands that manufacturers of IHS(s) provide assurances that an information handling system ordered from the manufacturer has not been tampered with prior to receipt by the customer, or after delivery. For example, without security measures in place, an interloper could possibly intercept an IHS during transit. Examples of such interlopers can include a foreign intelligence agency, a business competitor, or other person with harmful intent. Hardware and software components of the IHS could then be replaced with malicious components intended to mimic the replaced components while performing some malicious operation. Functionality of the IHS or data integrity can be compromised. Furthermore, even if an IHS is delivered to an intended end user without tampering, such tampering may also occur at the destination before formal acceptance of the IHS. For example, a rogue employee, an individual gaining unauthorized access, or other person with harmful intentions can gain access to a receiving area. While many approaches, such as Trusted Platform Module (TPM), have been employed to ensure security of software during transit from manufacturer to intended end user, the industry still lacks an effective approach for providing such security with respect to hardware components and firmware residing on such components.

BRIEF SUMMARY

In accordance with the teachings of the present disclosure, an information handling system (IHS) includes a way to detect tampering that can occur with informational handling resources. The IHS includes an interface that enables communication with an audit device. The IHS also includes locally-available information handling resources, system memory, and a controller. The controller includes a processor subsystem which executes a system management audit (SMA) agent that configures the processor subsystem to randomly generate a unique code. The controller creates a time-stamped system log entry for a last authorized configuration change of locally-available information handling resources. The controller stores the log entry in a system memory of the IHS and generates a SMA log snapshot of the time-stamped system log entry combined with the unique code. The controller provides the SMA log snapshot to the audit device prior to the IHS being placed in transit to a recipient of the IHS. The SMA log snapshot is transmitted to the recipient via a separate transmission to be used during downstream verification of the integrity of the shipment (i.e., determining if the IHS was accessed or tampered with during shipment). The IHS is powered down for transit. In response to later powering up at least the controller of the IHS after or during transit, the controller obtains a current SMA log snapshot that includes a current SMA log entry and a current unique code. The controller provides access to the current SMA log snapshot by an audit device to initiate a comparison of the current SMA log snapshot to the SMA log snapshot generated prior to transit of the IHS in order to identify whether there has been a change indicating tampering with the IHS during transit.

In accordance with embodiments of the present disclosure, a method is provided to detect tampering with functional components of an IHS during transit. The method includes randomly generating a unique code. A time-stamped system log entry is created in a system memory of the IHS for a last authorized configuration change of locally-available information handling resources. The method includes generating a SMA log snapshot of the time-stamped system log entry combined with the unique code. The SMA log snapshot is stored in system memory. Prior to transit, the SMA log snapshot is provided to an audit device for separately conveying to a recipient of the IHS. In response to powering up at least a portion of the IHS after transit, the method includes obtaining a current SMA log snapshot from the system memory that includes a current SMA log entry and a current unique code. The method includes providing access to the current SMA log snapshot by an audit device. The method includes comparing the current SMA log snapshot to the SMA log snapshot generated prior to transit for identifying any change indicative of tampering with the IHS during transit.

According to illustrative embodiments of the present disclosure, a controller includes an interface in communication with an audit device. The controller includes a processor subsystem which executes a SMA agent. The SMA agent configures the processor subsystem to randomly generate a unique code. The SMA agent creates a time-stamped system log entry for a last authorized configuration change of locally-available information handling resources. A SMA log snapshot is generated of the time-stamped system log entry combined with the unique code. Prior to transit, the SMA agent provides the SMA log snapshot to the audit device for separately conveying to a recipient of the IHS. The IHS is powered down for transit. In response to powering up at least the controller of the IHS after transit, the SMA agent obtains from system memory a current SMA log snapshot that includes a current SMA log entry and a current unique code. Access is provided to the current SMA log snapshot to the audit device. The audit device facilitates manual or automatic comparison of the current SMA log snapshot to the SMA log snapshot that was created prior to transit in order to identify whether there has been tampering with the IHS during transit.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
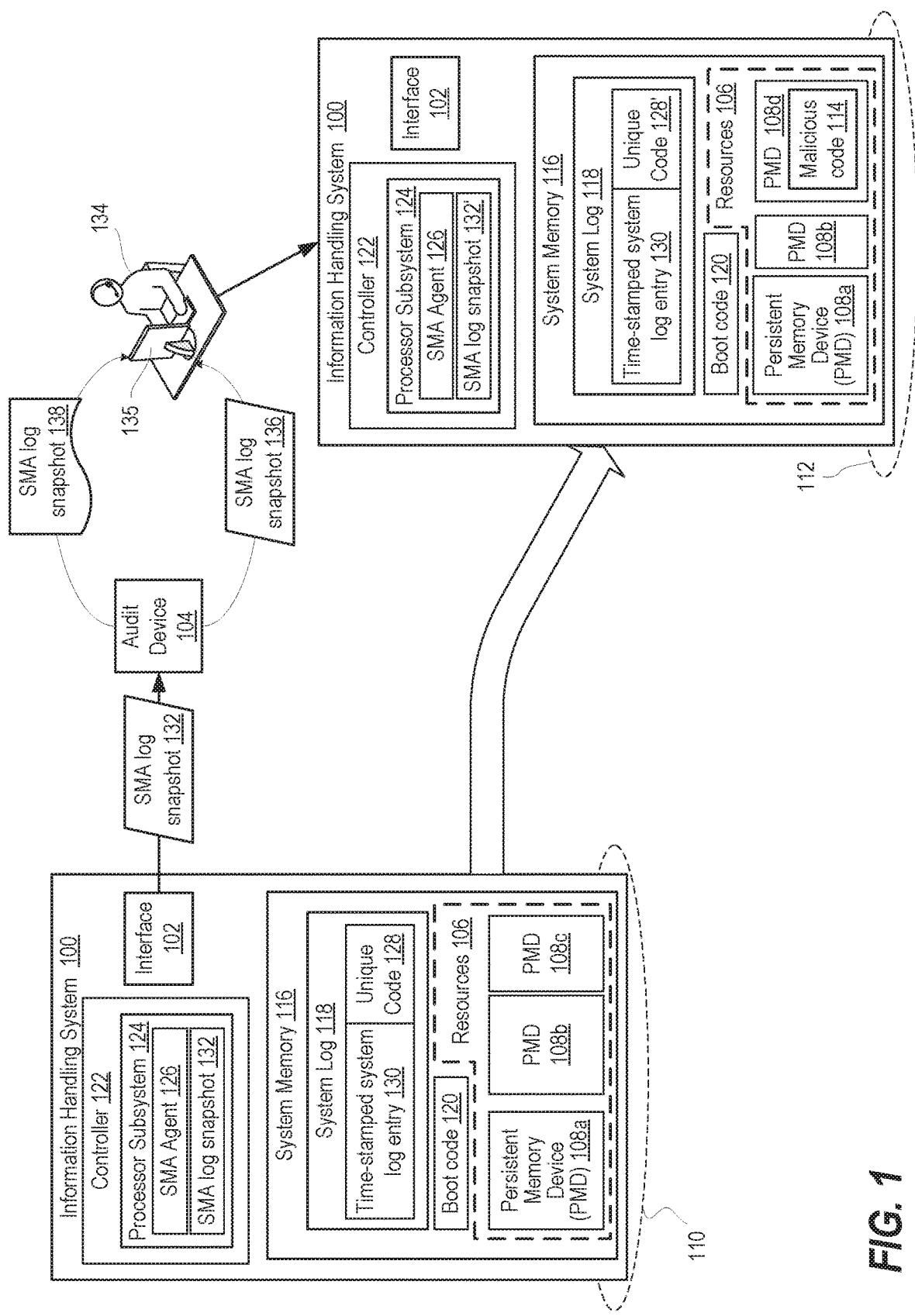
FIG. 1 illustrates a block diagram representation of an example information handling system (IHS) that supports system management auditing to detect tampering during transit, according to one or more embodiments.

According to the described embodiments, a controller of an information handling system (IHS) performs a method to detect tampering with functional components of IHS during transit. A unique code is generated and stored with a time-stamped system log entry in a system memory for a last authorized configuration change of locally-available information handling resources. Prior to transit, a system management audit (SMA) log snapshot is generated and stored in system memory. The SMA log snapshot is provided to an audit device prior to transit for separately conveying to a recipient of the IHS. In response to powering up at least the controller of the IHS after transit, a current SMA log snap is obtained that includes a current SMA log entry and a current unique code. The current SMA log snapshot is compared by an audit device to the SMA log snapshot created and provided prior to transit with any change indicating that there has been tampering with the IHS during transit. The unique code in both of the system log and SMA log snapshot can stored in memory that is not accessible for externally reading.

The present innovation can provide an assurance that an IHS has been received without tampering or can identify such tampering before a greater damage results due to loss of network integrity or data privacy. This shipment safeguard addresses a vulnerability that arises when neither sending nor receiving party have complete control over the IHS during transit. Thus, no trusted party can assure that the integrity of the IHS has been maintained. In one or more embodiments, an original equipment manufacturer (OEM) or distributor can ship an IHS to a recipient user at a datacenter. Both parties have an interest in ensuring that no unscrupulous third parties have attempted to compromise the security of their datacenter by introducing malicious code into the IHS during transit. For example, a memory device containing the malicious code could be inserted into the IHS. For another example, the IHS could have been powered up and changes made to the code stored in the resources of the IHS. The controller of the IHS performs a method that mitigates such occurrences by creating a unique system management audit (SMA) log before transit that can be compared with a current SMA log after transit to detect such tampering.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates an information handling system (IHS) 100 having an interface 102 that enables communication with an audit device 104. IHS 100 includes locally-available information handling resources 106, such as persistent memory devices (PMD) 108a-108c that can be configured at an original equipment manufacturer (OEM) location 110 or later at a user location 112. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal digital assistant (PDA), a consumer electronic device, a network storage device, or any other suitable device and may vary in size, shape, performance, functionality, and price. For the purposes of this disclosure, information handling resources may broadly refer to any component system, device or apparatus of an IHS, including without limitation processors, service processors, basic input/output systems (BIOSs), buses, memories, I/O devices and/or interfaces, storage resources, network interfaces, motherboards, and/or any other components and/or elements of an IHS. The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Referring again to FIG. 1, the IHS 100 is presented at two different locations 110, 112. A first location represents an OEM or manufacturing location where the IHS is provisioned. A second location represents an end-user location or shipping destination of the IHS. When in transit between locations 110, 112, opportunities can exist for unauthorized changes in the information handling resources 106, such as by inserting a persistent memory device 108d that contains malicious code 114. To mitigate this susceptibility, IHS 100 provides for detection of tampering, as described herein. System memory 116 of the IHS 100 maintains a system log 118 that is incrementally updated to capture any changes in configuration of the IHS 100. For example, the identity of PMDs 108a-108d is determined during start up as part of execution of boot code 120. In addition, the identity of persistent memory devices 108 is updated in response to a runtime hot plugging event. Based on changes in the identity of the persistent memory devices 108, the system log 118 is appended. Tampering by inserting or replacing a persistent memory device 108 results in a different time stamp that can be detected. Even if a sophisticated interloper attempts to change the system log 118 to have the original timestamp, the IHS 100 creates a new unique code for storing within the system log 118.

In one or more embodiments, a controller 122 includes a processor subsystem 124 which executes a system management audit (SMA) agent 126. The SMA agent 126 of controller 122 configures processor subsystem 124 to randomly generate unique code 128. Controller 122 creates a time-stamped system log entry 130 in the system memory 116 of IHS 100 for a last authorized configuration change of locally-available information handling resources 106. Controller 122 generates SMA log snapshot 132 of time-stamped system log entry 130 combined with unique code 128. Prior to transit, controller 122 and interface 102 provides the SMA log snapshot 132 to the audit device 104 for separately conveying to a recipient 134 of the IHS 100. For example, the audit device 104 can be a remote network storage accessible with appropriate credentials by a recipient's device 135. Recipient's device 135 can receive in machine-readable form an SMA log snapshot file 136. The audit device 104 can be part of a material handling system that generates customized documentation in human readable form containing specific passwords and other identifiers specific to IHS 100, such as an SMA log snapshot document 138. SMA log snapshot 132 is also stored by controller 122 on IHS 100. In one or more embodiments, SMA log snapshot 132 is stored in a component that is not readable from an external device. SMA log snapshot 132 can be encrypted by a trusted controller of IHS 100, such as controller 122, with encryption keys that cannot be accessed. The trusted controller can decrypt the SMA log snapshot 132 for system management auditing.

In one or more embodiments, creation of the SMA log snapshot 132 is part of an automated shutdown for shipping procedure that includes powering down the IHS 100 for transit. Then IHS 100 is shipped to user location 112. SMA log snapshot 132 is expected to remain unchanged on IHS 100 during transit. PMDs 108a-108c for example are expected to be inserted prior to preparing IHS 100 for transit and to be the same components that are present upon first use by an end user.

In one scenario in which tampering occurs, replacement of one PMD 108 with PMD 108' containing malicious code 120 can occur. The introduction of different PMD 108d will cause a new time-stamped system log entry 130 to be created and stored. Even if the time-stamped system log entry 130 is altered to match the same time, the original unique code 128 is not accessible. Due to a change such as clearing the stored time-stamped system log entry 130, a new unique code 128' is stored that does not match the original unique code 128. This change creates a way to affirmatively detect tampering.

In response to powering up at least controller 122 of IHS 100 after transit, controller 122 obtains a current SMA log snapshot from system memory 116 that includes a current SMA log entry and a current unique code. Controller 122 provides the current SMA log snapshot 132 to an audit device 104 for comparison of the current SMA log snapshot 132' to the SMA log snapshot 132 accessed prior to transit. Identical snapshots 132, 132' provides an assurance of no tampering. Any change between snapshots 132, 132' provides an affirmative indication that there has been tampering with the IHS 100 during transit. The affirmative indication provides timely opportunity to mitigate future damage. IHS 100 can be returned and not placed into production. The offending tampering can be removed. Damage to operations or compromise to confidential or private data can be avoided.

Figure 2:
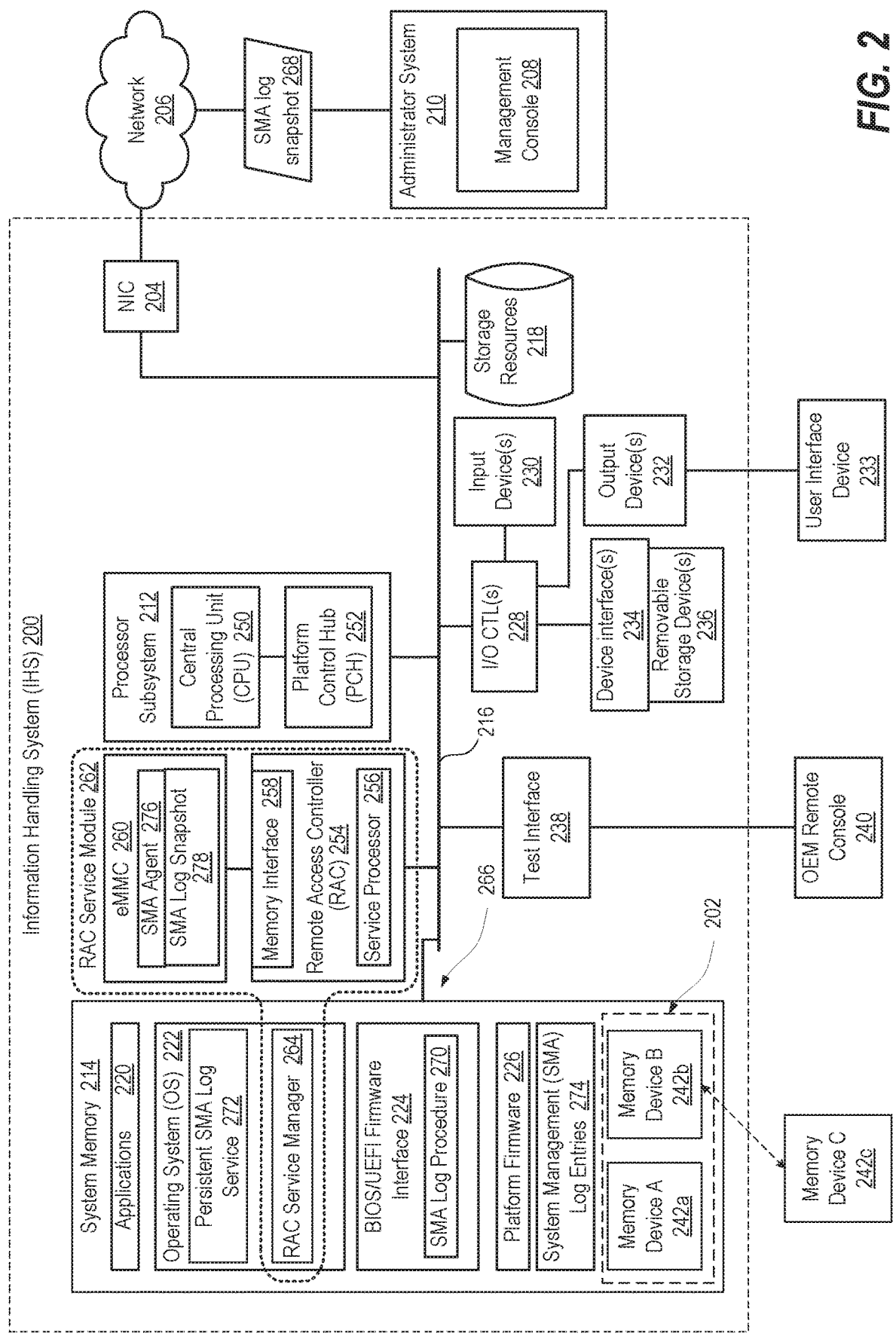
FIG. 2 illustrates a block diagram representation of an example IHS having information handling resources whose integrity can be confirmed after transit, according to one or more embodiments.

FIG. 2 illustrates a block diagram representation of an example IHS 200 having information handling resources 202 whose integrity requires confirmation after transit. IHS 200 provides an exemplary computing environment as one embodiment of an IHS 100 (FIG. 1). IHS 200 includes features for detecting tampering with the information handling resources 202. IHS 200 includes a network interface, depicted as a network interface controller (NIC) 204, in communication via a network 206, with a management console 208 of an administrator system 210. A host processor subsystem 212 is coupled to system memory 214 via system interconnect 216. System interconnect 216 can be interchangeably referred to as a system bus, in one or more embodiments. System interconnect 216 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 216 can also be a Double Data Rate (DDR) memory interface. The system memory 214 can either be contained on separate removable dual inline memory module (RDIMM) devices or system memory 214 can be contained within persistent memory devices (NVDIMMs). For example, the NVDIMM-N variety of NVDIMMs contain both random access memory, which can serve as system memory, and non-volatile memory. It should be noted that other channels of communication can be contained within system interconnect 216, including but not limited to i2c or system management bus (SMBus). System interconnect 216 communicatively couples various system components including, for example, replaceable local storage resources 218 such as solid state drives (SDDs) and hard disk drives (HDDs) within which can be stored one or more software and/or firmware modules and one or more sets of data that can be utilized during operations of management IHS 200. Specifically, in one embodiment, system memory 214 can include therein a plurality of such modules, including one or more of application(s) 220, operating system (OS) 222, a firmware interface 224 such as basic input/output system (BIOS) or Uniform Extensible Firmware Interface (UEFI), and platform firmware (FW) 226. These software and/or firmware modules have varying functionality when their corresponding program code is executed by host processor subsystem 212 or secondary processing devices within management IHS 200. For example, application(s) 220 may include a word processing application, a presentation application, and a management station application, among other applications.

IHS 200 further includes one or more input/output (I/O) controllers 228 that support connection by and processing of signals from one or more connected input device/s 230, such as a keyboard, mouse, touch screen, or microphone. I/O controllers 228 also support connection to and forwarding of output signals to one or more connected output devices 232, such as a monitor or display device or audio speaker(s). In one or more embodiments, a user interface device 233 provides both input and output functionality. Additionally, in one or more embodiments, one or more device interfaces 234, such as an optical reader, a universal serial bus (USB), a card reader, Personal Computer Memory Card International Association (PCMCIA) slot, and/or a high-definition multimedia interface (HDMI), can be associated with IHS 200. Device interface(s) 234 can be utilized to enable data to be read from or stored to corresponding removable storage device/s 236, such as a compact disk (CD), digital video disk (DVD), flash drive, or flash memory card. In one or more embodiments, device interface(s) 234 can further include general purpose I/O interfaces such as inter-integrated circuit ($I^2C$), system management bus (SMB), and peripheral component interconnect (PCI) buses. One or more device interface(s) 234 can support removable storage devices (RSDs) 236. Certain interfaces can be available during manufacture, configuration, and testing. These interfaces are depicted as test interface 238. In one or more embodiments, an original equipment manufacturer (OEM) or other authorized party can interact with the functional components of IHS 200 via an OEM remote console 240 coupled to test interface 238. Memory device A 242a and memory device B 242b represent portions of system memory 214 that can be configured or verified via the OEM remote console 240. Memory device C 242c represents another resource that is not included in IHS 200 prior to transit. In an illustrative scenario, memory device C 242C is inserted into the IHS 200 in an unauthorized manner. The present disclosure provides for affirmative detection of such insertion, as described herein.

NIC 204 enables IHS 200 and/or components within IHS 200 to communicate and/or interface with other devices, services, and components that are located external to IHS 200. These other devices, services and/or components are represented as network devices such as administrator system 210. These devices, services, and components can interface with IHS 200 via an external network, such as example network 206, using one or more communication protocols that include transport control protocol (TCP/IP) and network block device (NBD) protocol. Network 206 can be a local area network, wide area network, personal area network, and the like, and the connection to and/or between network and IHS 200 can be wired, wireless, or a combination thereof. For purposes of discussion, network 206 is indicated as a single collective component for simplicity. However, it should be appreciated that network 206 can comprise one or more direct connections to other devices as well as a more complex set of interconnections as can exist within a local area network or a wide area network, such as the Internet.

Host processor subsystem 212 can include a central processing unit (CPU) 250 that is augmented by a platform control hub (PCH) 252. PCH 252 interfaces to functional components of IHS 200 such as a baseboard management controller (BMC), depicted as a remote access controller (RAC) 254. In one or more embodiments, a specialized service processor 256 of RAC 254 performs BMC functionality. For example, RAC 254 monitors the physical state of a computer, network server or other hardware device, such as information handling resources 202. RAC 254 communicates with a system administrator through an independent connection, such as NIC 204. As a non-limiting example, RAC 254 can be an improved integrated Dell Remote Access Controller (iDRAC) from Dell® that supports the additional multipath functionality described herein. The iDRAC has the ability to edit/create files locally to itself. The iDRAC also has the ability to see OS specific files. RAC 254 performs out-of-band communication for IHS 200 via NIC 204 and network 206 to a network device, such as a management console 208 on administrator system 210. RAC 254 can have access, via a memory interface (I/F) 258, to a persistent storage device, such as an embedded multimedia card (eMMC) 260. The eMMC 260 is a flash memory and controller packaged into a small ball grid array (BGA) integrated circuit (IC) package for use in circuit boards as an embedded non-volatile memory system. The eMMC 260 is separate from system memory 214. RAC 254 is a part of RAC service module 262 having a RAC service manager 264 resident in system memory 214 and executed by host processor subsystem 212. RAC service manager 264 provides a runtime interface between RAC 254 and system memory 214.

In one or more embodiments, RAC service module 262 solely performs all of operations of SMA, functioning as controller 266. In one or more embodiments, RAC 262 acts as controller 266 by performing a portion of the operations of SMA with distributed processing by host processor subsystem 212. Controller 266 is coupled to an interface by which controller 266 that enables communication with an audit device. In one or more embodiments, test interface 238 and OEM remote console 240 provide this capability of enabling communication of the SMA log snapshot to an audit device. In one or more embodiments, NIC 204 and management console 208 provide this capability of enabling communication of the SMA log snapshot to an audit device. In one or more embodiments, I/O controllers 228 and user interface device 233 provide this capability. These three capabilities are exemplary. Other embodiments can provide another type of communication channel that serves to convey an SMA log snapshot 268 separately from on-board memory storage provided on the IHS 200. SMA log snapshot 268 can be based, in certain instances, on execution of an SMA log procedure 270 executed by the firmware interface 224 during start-up of the host processor subsystem 212. SMA log snapshot 268 can be based, in certain instances, on execution of persistent SMA log service 272 executed by the operating system 222 during runtime of the host processor subsystem 212. The persistent SMA log service 272 can be triggered by a hot plugging of a memory device A-C 242a-242c to prompt creation of a system management log entry 274.

RAC 254 can include an SMA agent 276 that is executed by the service processor 256 to access system management log entries 274 stored in system memory 214 or storage resources 218. In one or more embodiments, the host processor subsystem 212 generates a unique code that is stored with the system management log entries 274. In one or more embodiments, as part of creating a current SMA log snapshot 278 that is stored in persistent memory eMMC 260, RAC 254 creates and adds the unique code. If the current SMA log snapshot 278 in eMMC 260 is the same as the transmitted or otherwise conveyed SMA log snapshot 268, then no changes have occurred to the information handling resources 202. The current SMA log snapshot 278 would then be the same as the snapshot generated for a last authorized configuration change of locally-available information handling resources 202. As part of preparing the IHS 200, RAC service manager 254 can perform a procedure prior to transit that includes: (i) triggering reset; (ii) accessing the SMA log entries 274; (iii) creating an SMA snapshot; (iv) locally storing the SMA snapshot; (v) providing the SMA log snapshot 268 to an audit device for conveying to a recipient of the IHS 200 separate from the shipping channel of the IHS 200; and (vi) powering down the processor subsystem 212 and system memory 214.

In one or more embodiments, RAC 254 can perform out-of-band communications while the rest of the IHS 200 is inactive. For example, RAC 254 can be used to shutdown and restart portions of IHS 200 that are not needed to handle a current workload. As part of obtaining a current SMA log snapshot 278, RAC 254 can trigger the host processor subsystem 212 to start, in order to confirm that no configuration changes have occurred during transit. For example, the management console 208 can be used to commission one or more IHS(s) 200 received at a datacenter. An operator of the management console 208 receives information for each of the IHS (s) 200 that was conveyed separately from the respective IHS(s) 200. The information can be in human readable form or in machine readable form or both forms, in one or more embodiment. An automated or manual procedure, implemented by one or both of the RAC 254 and management console 208, can be executed. The procedure assumes that each of the selected IHS(s) 200 have been unused since being shipped from the destination, up to arrival and storage at the recipient location. As part of initial checkout and integration of IHS 200 into the datacenter, SMA log verification can be performed utilizing the checks described herein.

Figure 3:
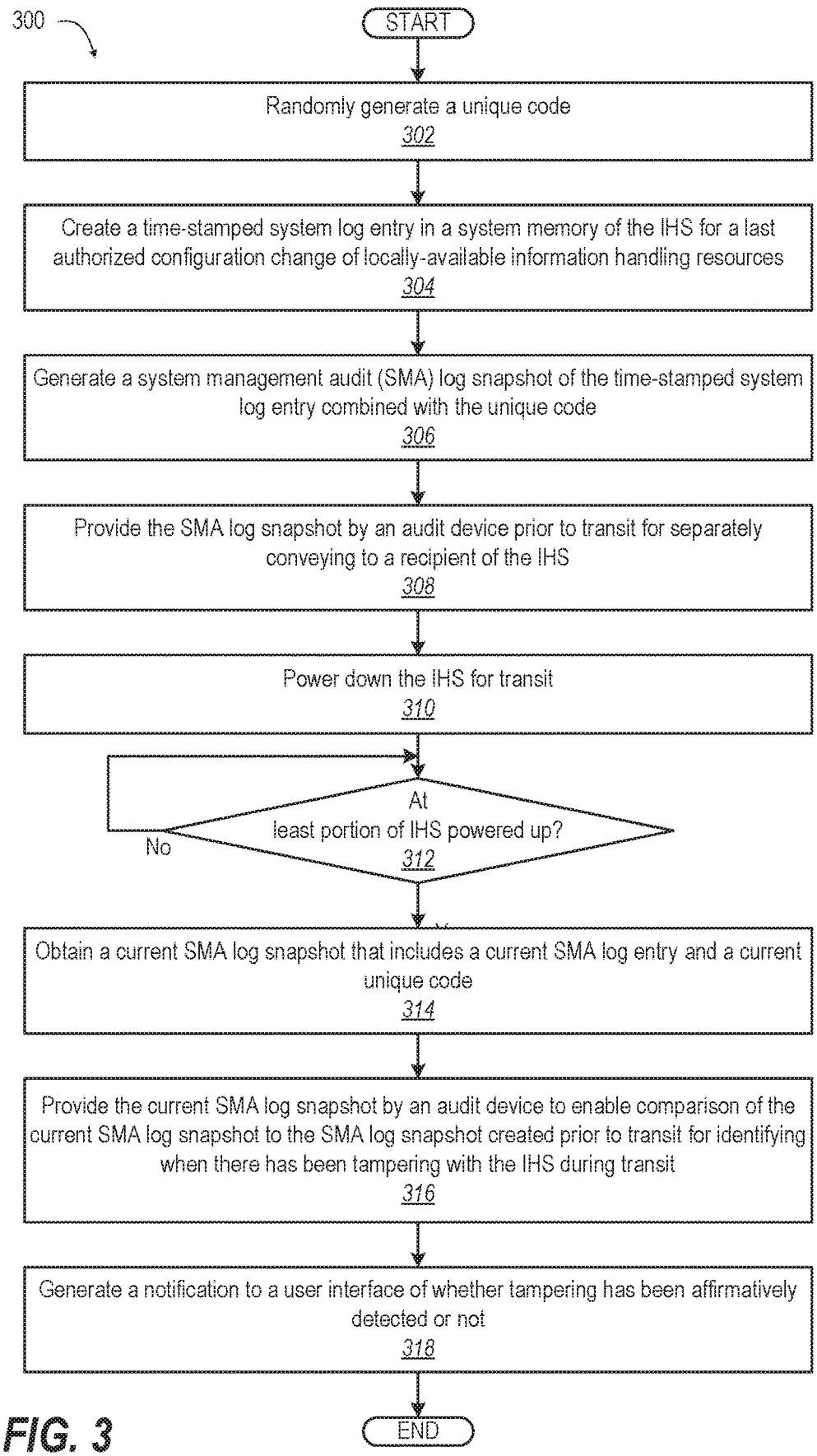
FIG. 3 illustrates a method of detecting tampering with functional components of an IHS between the provisioning of the IHS and the first use by the end user, according to one or more embodiments.
Figure 4A:
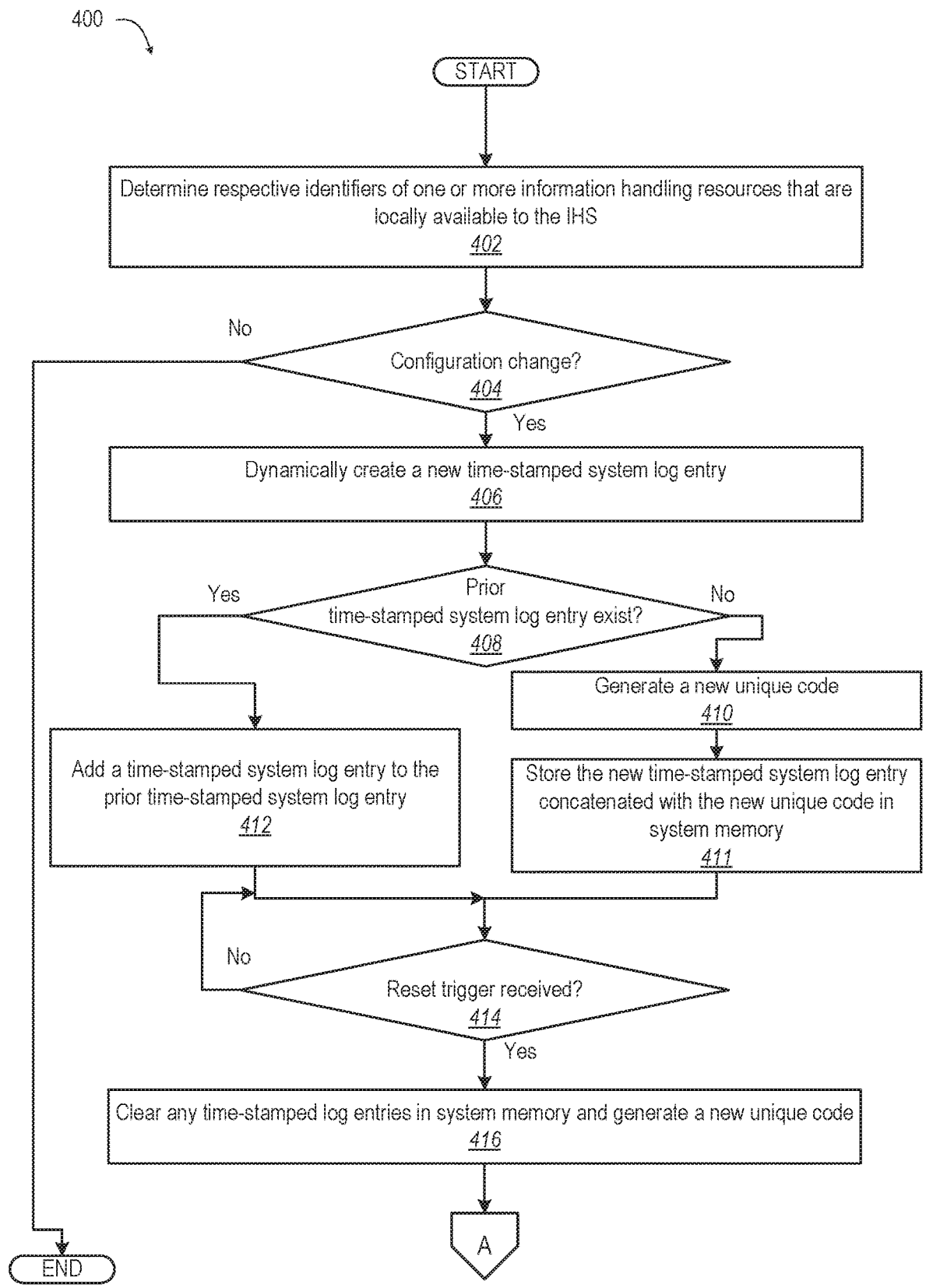
FIGS. 4A-4B illustrate flow diagram representations of a method of providing a system management audit log snapshot of information handling resources of an IHS prior to transit of the IHS to allow for determining if the IHS resources are tampered with prior to being used by an intended end user, according to one or more embodiments.
Figure 4B:
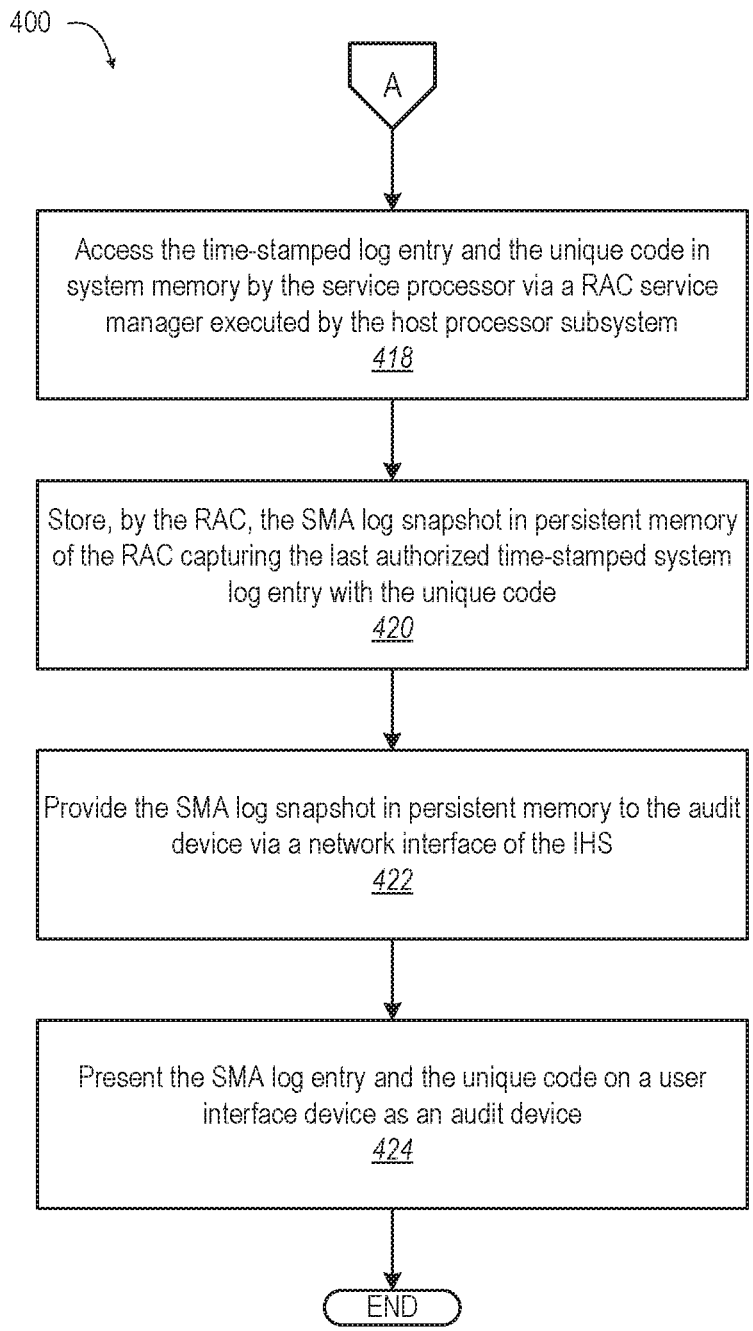

FIGS. 3 and 4A-4B illustrate flowcharts of exemplary methods 300, 400 by which a controller 122 (FIG. 1) and/or a controller 266 (FIG. 2) performs different aspects of the processes that enable the one or more embodiments of the disclosure. Generally, methods 300, 400 represent computer-implemented methods. The description of methods 300, 400 are provided with general reference to the specific components illustrated within FIGS. 1-2.

FIG. 3 illustrates a method 300 of detecting tampering with functional components of an IHS between the provisioning of the IHS (i.e., following a final shut down of the IHS just prior to shipment to an end user destination) and the first use by the end user. In one or more embodiments, method 300 begins at block 302 with a processor of an IHS randomly generating a unique code (block 302). The processor creates a time-stamped system log entry in a system memory of the IHS for a last authorized configuration change of locally-available information handling resources (block 304). Method 300 includes generating a system management audit (SMA) log snapshot of the time-stamped system log entry combined with the unique code (block 306). In one or more embodiments, the unique code is text comment appended to the time-stamped system log entry. The unique code can be in a portion of memory that is not externally readable. The unique code can be embedded with other data identifiers in a manner that does not appear noteworthy if readable by an interloper. Method 300 includes, prior to transit, providing the SMA log snapshot to an audit device for separately conveying to a recipient of the IHS (block 308). The IHS is powered down for transit (block 310). Method 300 then includes determining whether at least a portion of the IHS is powered up (decision block 312). If the IHS is not powered up, method 300 returns to decision block 312 to wait for powering up of the IHS. In response to determining that at least the portion of the IHS is powered up, method 300 includes obtaining a current SMA log snapshot that includes a current SMA log entry and a current unique code (block 314). Processor provides access to the current SMA log snapshot by an audit device that is external to the IHS. The audit device compares the current SMA log snapshot to the SMA log snapshot accessed prior to transit. Any difference found between the two snapshots identifies that there has been tampering with the IHS during transit (block 316). Method 300 includes generating a notification to a user interface of whether tampering has been affirmatively detected or not (block 318). Then method 300 ends.

FIGS. 4A-4B illustrate a method 400 of providing a system management audit log snapshot of information handling resources prior to transit of an IHS to allow for determining if the IHS resources are tampered with prior to being used by an intended end user. Method 400 begins at block 402 with the processor of the IHS determining respective identifiers of one or more information handling resources that are locally available to the IHS. In one or more embodiments, changes to resources are detected during each start-up. In one or more embodiments, changes to resources are detected during each runtime hot plugging event (block 402). A determination is made by a host processor of whether a configuration change has occurred in the one or more information handling resources. In one or more embodiments, the host processor can track identifiers for each memory module (decision block 404). In response to not detecting a configuration change, method 400 ends. In one or more embodiments, a system log entry can be created to record operational events, such as a power up, in addition to responding to configuration changes. In response to detecting a configuration change in the one or more information handling resources, method 400 includes dynamically creating a new time-stamped system log entry (block 406). A determination is made whether any prior time-stamped system log entry exists (decision block 408). In response to determining that a prior time-stamped system log entry does not exist, method 400 includes generating a new unique code (block 410). Method 400 includes storing the new time-stamped system log entry concatenated with the new unique code in system memory (block 411). The time-stamped system log entry with concatenated unique code is stored in system memory (block 411). In response to determining that a prior time-stamped system log entry does exist, a time-stamped system log entry is added to the prior time-stamped system log entry (block 412). In one or more embodiments, a new unique code is generated for each and every new time-stamped log entry, regardless of whether one is already recorded.

In one or more embodiments, method 400 can be executed in part by a remote access controller (RAC) of the IHS that performs out-of-band communications with remote devices, whether or not the host processor is active. The RAC can perform baseboard management controller (BMC) functions or chassis-level services for a number of servers and functional components that constitute the IHS. For example, after performing either block 410 or 412, method 400 can include determining whether a reset trigger is received by a host processor subsystem from RAC as part of preparing the IHS for transit (decision block 414). In response to determining that the reset trigger is not received, method 400 repeats block 414 to wait for a reset. In response to determining that the reset trigger is received, method 400 includes: (i) clearing any time-stamped log entries in system memory; and (ii) generating a new unique code (block 416). The SMA log snapshot is generated by a service processor of the RAC. In particular, method 400 includes accessing the time-stamped log entry and the unique code in system memory by the RAC. In one or more embodiments, the service processor of the RAC communicates with a RAC service manager executed by the host processor subsystem to access the system memory (block 418). Method 400 includes storing, by the RAC, the SMA log snapshot in persistent memory of the RAC capturing the last authorized time-stamped system log entry with the unique code (block 420). RAC provides the SMA log snapshot in persistent memory to the audit device via a network interface of the IHS (block 422). The SMA snapshot can be provided by the RAC when the rest of the IHS is inactive after shutdown for transit. In one or more embodiments, method 400 can include presenting the SMA log entry and the unique code on a user interface device of an audit device (block 424). The user interface device can be used to separately convey the SMA log snapshot to the recipient of the IHS in a shipping or transmission channel that is apart from the IHS. An interloper should not be able to intercept the separately conveyed SMA snapshot. The same or another user interface device can subsequently be used after transit for comparing the current SMA log entry and the current unique code to a previously separately-conveyed SMA log entry and unique code that is created prior to transit by the audit device. Then method 400 ends.

In the above described flow charts of FIGS. 3 and 4A-4B, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method to detect tampering with functional components of an information handling system (IHS), the method comprising:
   randomly generating a unique code;

a host processor subsystem creating a time-stamped system log entry for a last authorized configuration change of locally-available information handling resources;

storing the time-stamped system log entry in a system memory of the IHS;

generating, by a service processor of a remote access controller (RAC) of the IHS, a system management audit (SMA) log snapshot of the time-stamped system log entry combined with the unique code, the generating comprising:

accessing the time-stamped log entry and the unique code in the system memory by the service processor via a RAC service manager executed by the host processor subsystem; and storing, by the RAC, the SMA log snapshot in persistent memory of the RAC, which memory is not readable from an external device;

providing the SMA log snapshot to an audit device prior to transit of the IHS, the provided SMA log snapshot for use by the audit device in determining if tampering has occurred with the IHS during transit of the IHS or after the IHS arrives at an end user destination prior to use by an intended end user;

in response to powering up at least a portion of the IHS after transit:

obtaining from the IHS a current SMA log snapshot that includes a current SMA log entry and a current unique code; and providing access to the current SMA log snapshot by the audit device, which performs a comparison of the current SMA log snapshot with the SMA log snapshot provided to the audit device prior to transit of the IHS to identify whether there has been tampering with the IHS during transit or prior to use by the intended end user.

2. The method of claim 1, further comprising:

presenting the SMA log entry and the unique code on a user interface device of the audit device in human-readable form, wherein the audit device separately conveys the SMA log snapshot to a recipient of the IHS in a shipping or transmission channel that is apart from the IHS.

3. The method of claim 1, further comprising:

determining respective identifiers of one or more information handling resources that are locally available to the IHS during: (i) each start-up; and (ii) each hot plugging event during runtime;

in response to detecting a configuration change in the one or more information handling resources, dynamically creating a new time-stamped system log entry, wherein a new time-stamped system log entry is automatically generated for each detected configuration change;

determining whether any prior time-stamped system log entry exist; and in response to determining that a prior time-stamped system log entry does not exist, generating a new unique code that is stored with the new time-stamped system log entry in an updated SMA log snapshot.

4. The method of claim 1, further comprising:

prior to powering down the IHS for transit:

deleting any prior time-stamped system log entry in the system memory;

creating the last authorized time-stamped system log entry with the unique code;

storing the last authorized time-stamped system log entry in system memory; and generating the SMA log snapshot that is locally stored in RAC memory and shared with the remote audit device.

5. The method of claim 1, further comprising:

prior to powering down the IHS for transit, transmitting the SMA log snapshot to a remote storage device;

subsequent to powering up, providing access to a management console of the recipient of the IHS to: (i) the current SMA log snapshot stored on the IHS; and (ii) the transmitted SMA log snapshot stored on the remote storage device.

6. The method of claim 1, wherein:

randomly generating the new unique code and creating the time-stamped log entry comprises:

determining whether a reset trigger is received by a host processor subsystem from the remote access controller (RAC); and in response to determining that the reset trigger is received by the host processor: (i) clearing any time-stamped log entries in system memory; and (ii) generating a new unique code; and the method comprises: generating the SMA log snapshot using the new unique code and a current time-stamped log entry; and providing, by the RAC to the audit device, the SMA log snapshot via a network interface of the IHS.

7. A controller comprising:

an interface in communication with an audit device;

a processor subsystem which executes a system management audit (SMA) agent that configures the processor subsystem to:

randomly generate a unique code;

create a time-stamped system log entry in a system memory of the IHS for a last authorized configuration change of locally-available information handling resources; and a service processor which:

generates a SMA log snapshot of the time-stamped system log entry combined with the unique code;

stores the SMA log snapshot in a persistent memory that is not readable from an external device;

provides the SMA log snapshot to the audit device prior to transit for use in determining if tampering has occurred with the IHS during transit of the IHS or at an end user destination;

in response to powering up at least the controller of the IHS after transit, obtains a current SMA log snapshot that includes a current SMA log entry and a current unique code; and provides access to the current SMA log snapshot by the audit device to enable comparison of the current SMA log snapshot to the SMA log snapshot from prior to transit for identifying when there has been tampering with the IHS during transit or prior to use by the intended end user.

8. The controller of claim 7, wherein the SMA agent executed by the processor subsystem provides the SMA log entry and the unique code to a user interface device of the audit device in human-readable form and the audit device separately conveys the SMA log snapshot to a recipient of the IHS in a shipping or transmission channel that is apart from the IHS.

9. The controller of claim 7, wherein the SMA agent executed by the processor subsystem:

determines respective identifiers of one or more information handling resources that are locally available to the IHS during: (i) each start-up; and (ii) each hot plugging event during runtime;

in response to detecting a configuration change in the one or more information handling resources, dynamically creates a new time-stamped system log entry;
determining whether any prior time-stamped system log entry exist; and
in response to determining that a prior time-stamped system log entry does not exist, generates a new unique code that is stored with the new time-stamped system log entry in an updated SMA log snapshot.

10. The controller of claim 7, wherein the SMA agent executed by the processor subsystem:
prior to powering down the IHS for transit:
deletes any prior time-stamped system log entry in the system memory;
creates the last authorized time-stamped system log entry with the unique code;
stores the last authorized time-stamped system log entry in system memory; and
generates the SMA log snapshot that is locally stored in RAC memory and shared with the remote audit device.

11. The controller of claim 7, wherein the SMA agent executed by the processor subsystem:
prior to powering down the IHS for transit, transmits the SMA log snapshot to a remote storage device;
subsequent to powering up after transit, provides access to a management console of the recipient of the IHS to: (i) the current SMA log snapshot stored on the IHS; and (ii) the transmitted SMA log snapshot stored on the remote storage device.

12. The controller of claim 7, wherein:
the processor subsystem comprises: (i) a host processor subsystem coupled to system memory; and (ii) a service processor of a remote access controller (RAC) coupled to persistent memory;
the SMA agent is executed in part by the host processor and in part by the service processor;
the host processor subsystem randomly generates the new unique code and creates the time-stamped log entry by:
determining whether a reset trigger is received;
in response to determining that the reset trigger is received: (i) clears any time-stamped log entries in system memory; and (ii) generates a new unique code;
the service processor generates the SMA log snapshot by:
accesses the time-stamped log entry and the unique code in system memory via a RAC service manager executed by the host processor subsystem; and
stores, by the RAC, the SMA log snapshot in persistent memory of the RAC; and
providing, by the RAC, the SMA log snapshot in persistent memory via a network interface of the IHS to the audit device.

13. An information handling system (IHS) comprising:
an interface that enables communication with an audit device;
locally-available information handling resources;
system memory;
a processor subsystem which executes a system management audit (SMA) agent that configures the processor subsystem to:
randomly generate a unique code;
create a time-stamped system log entry in the system memory of the IHS for a last authorized configuration change of locally-available information handling resources; and
a service processor of a remote access controller that:

generates a SMA log snapshot of the time-stamped system log entry combined with the unique code;
stores the SMA log snapshot in a component that is not readable from an external device;
provides the SMA log snapshot to the audit device prior to transit for use in determining if tampering has occurred with the IHS during transit of the IHS or at an end user destination;
powers down the IHS for transit;
in response to powering up at least the controller of the IHS after transit, obtains a current SMA log snapshot from the current SMA log snapshot including a current SMA log entry and a current unique code; and
provides access to the current SMA log snapshot by an audit device, which performs a comparison of the current SMA log snapshot to the SMA log snapshot received prior to transit of the IHS to identify when there has been tampering with the IHS during transit or prior to use by the intended end user.

14. The IHS of claim 13, wherein the SMA agent executed by the processor subsystem provides the SMA log entry and the unique code to a user interface device of the audit device in human-readable form and the audit device separately conveys the SMA log snapshot to a recipient of the IHS in a shipping or transmission channel that is apart from the IHS.

15. The IHS of claim 13, wherein the SMA agent executed by the processor subsystem:
determines respective identifiers of one or more information handling resources that are locally available to the IHS during: (i) each start-up; and (ii) each hot plugging event during runtime;
in response to detecting a configuration change in the one or more information handling resources, dynamically creates a new time-stamped system log entry;
determining whether any prior time-stamped system log entry exist; and
in response to determining that a prior time-stamped system log entry does not exist, generates a new unique code that is stored with the new time-stamped system log entry in an updated SMA log snapshot.

16. The IHS of claim 13, wherein the SMA agent executed by the processor subsystem:
prior to powering down the IHS for transit:
deletes any prior time-stamped system log entry in the system memory;
creates the last authorized time-stamped system log entry with the unique code;
stores the last authorized time-stamped system log entry in system memory; and
generates the SMA log snapshot that is locally stored in RAC memory and shared with the remote audit device.

17. The IHS of claim 13, wherein the SMA agent executed by the processor subsystem:
prior to powering down the IHS for transit, transmits the SMA log snapshot to a remote storage device;
subsequent to powering up after transit, provides access to a management console of the recipient of the IHS to: (i) the current SMA log snapshot stored on the IHS; and (ii) the transmitted SMA log snapshot stored on the remote storage device.

18. The IHS of claim 13, wherein:
the processor subsystem comprises: (i) a host processor subsystem coupled to system memory; and (ii) a service processor of a remote access controller (RAC) coupled to persistent memory;

the SMA agent is executed in part by the host processor subsystem and in part by the service processor;

the host processor subsystem randomly generates the new unique code and creates the time-stamped log entry by:
  determining whether a reset trigger is received;
  in response to determining that the reset trigger is received: (i) clears any time-stamped log entries in system memory; and (ii) generates a new unique code;

the service processor generates the SMA log snapshot by:
  accesses the time-stamped log entry and the unique code in system memory via a RAC service manager executed by the host processor subsystem; and
  stores, by the RAC, the SMA log snapshot in persistent memory of the RAC; and enables access, by the RAC, to the SMA log snapshot in persistent memory via a network interface of the IHS the interface.

19. The method of claim 1, wherein in response to the comparison, the audit device generates a notification to a user interface of whether or not tampering has been affirmatively detected.

20. The method of claim 1, wherein generating a SMA log snapshot of the time-stamped system log entry combined with the unique code comprises concatenating the unique code with the time-stamped system log entry and storing the time-stamped system log entry concatenated with the unique code in system memory.

* * * * *